United States Patent
Ikedo et al.

(10) Patent No.: US 6,233,220 B1
(45) Date of Patent: May 15, 2001

(54) DISC CARTRIDGE HAVING VARIABLE GAP

(75) Inventors: Yuji Ikedo; Yusuke Akama; Akiyoshi Inoue, all of Saitama-ken (JP)

(73) Assignee: Pioneer Electronic Corporation, Tokyo (JP)

(*) Notice: Subject to any disclaimer, the term of this patent is extended or adjusted under 35 U.S.C. 154(b) by 0 days.

(21) Appl. No.: 09/213,752

(22) Filed: Dec. 17, 1998

(30) Foreign Application Priority Data

Dec. 17, 1997 (JP) .................................... 9-363948

(51) Int. Cl.⁷ .................................................. G11B 23/03
(52) U.S. Cl. ........................................ 369/291; 206/308.1
(58) Field of Search .............................. 369/34, 39, 77.1, 369/77.2, 178, 179, 192, 193, 289, 291, 292; 206/307, 308.1, 308.3; 360/92, 98.06, 98.04, 133

(56) References Cited

U.S. PATENT DOCUMENTS

| | | |
|---|---|---|
| 5,208,802 * | 5/1993 | Suzuki et al. ........................ 369/289 |
| 5,255,251 * | 10/1993 | Fitgerald et al. ...................... 369/36 |
| 5,548,577 * | 8/1996 | Miyazaki et al. ..................... 369/291 |
| 5,561,657 * | 10/1996 | Ogawa ................................... 369/179 |
| 5,570,337 * | 10/1996 | Dang ..................................... 369/192 |
| 5,579,297 * | 11/1996 | Childers et al. ...................... 369/291 |
| 5,719,851 * | 2/1998 | Yen ....................................... 369/291 |
| 5,903,542 * | 5/1999 | Sandell et al. ........................ 369/291 |

* cited by examiner

Primary Examiner—David L. Ometz
Assistant Examiner—Tianjie Chen
(74) Attorney, Agent, or Firm—Arent Fox Kintner Plotkin & Kahn PLLC

(57) ABSTRACT

A disc cartridge includes an upper lid and a lower lid for housing an optical disc or a magneto-optical disc between them. The disc cartridge also includes amechanism for making a gap between the upper lid and the lower lid varable. The mechanism increases a clearance between the surface of the disc housed in the disc cartridge and the inner surface of the upper and lower lids when the disc cartridge is inserted in an information recording and reproducing device. The mechanism may also increase a clearance between the outer rim of the disc and the inner wall of the disc cartridge when the disc cartridge is inserted in an information recording and reproducing device.

10 Claims, 9 Drawing Sheets

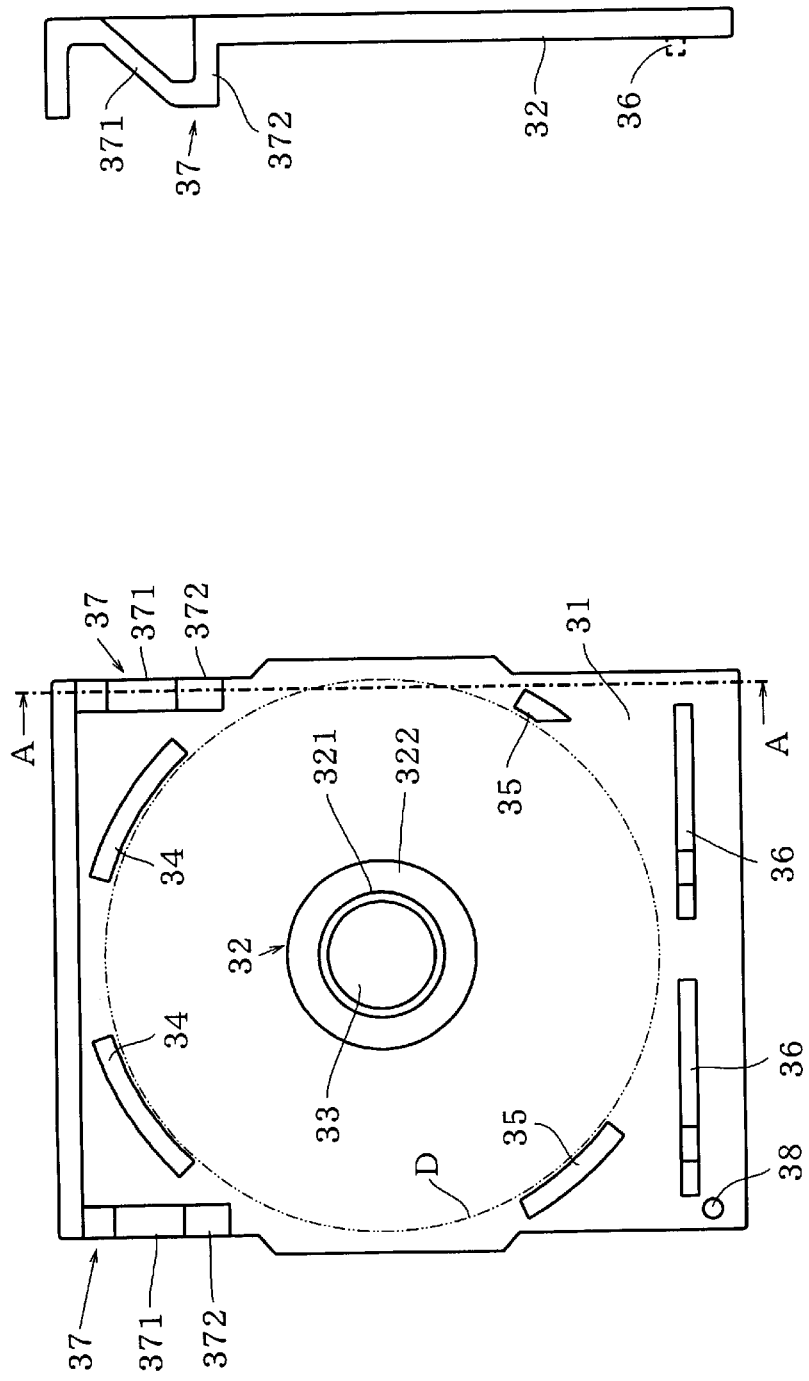

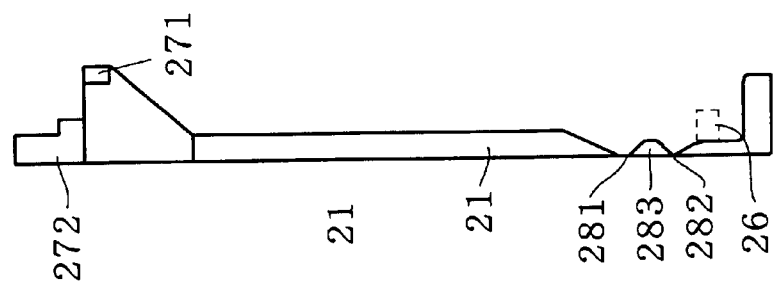
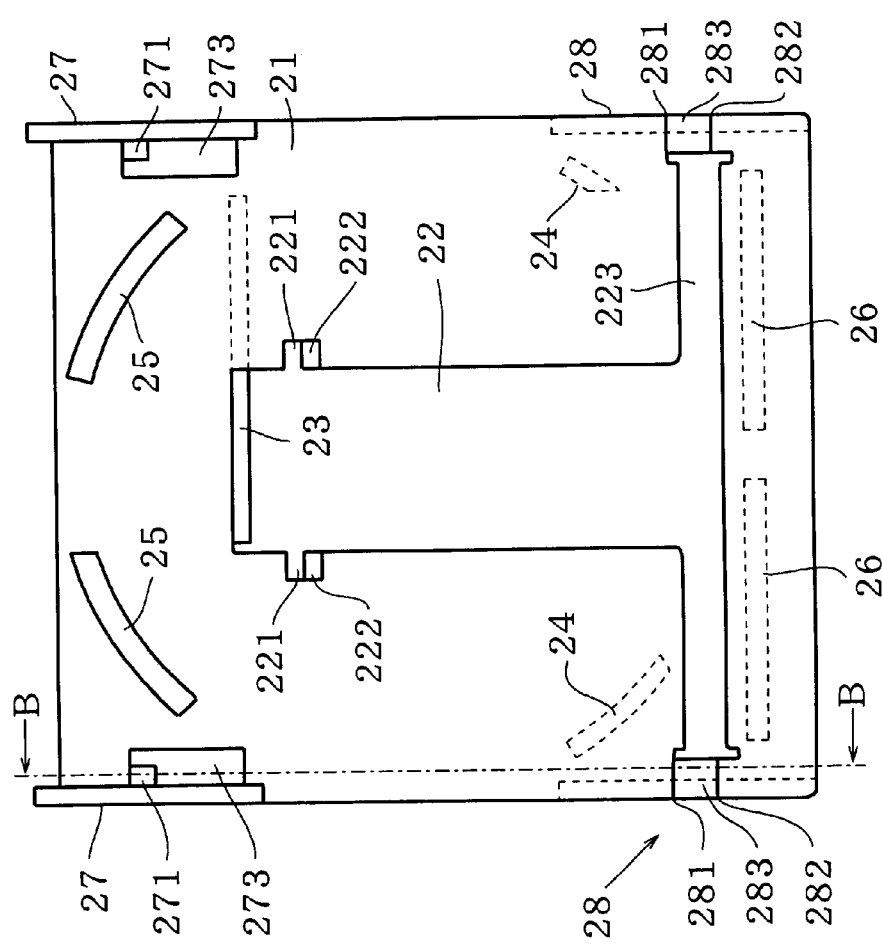

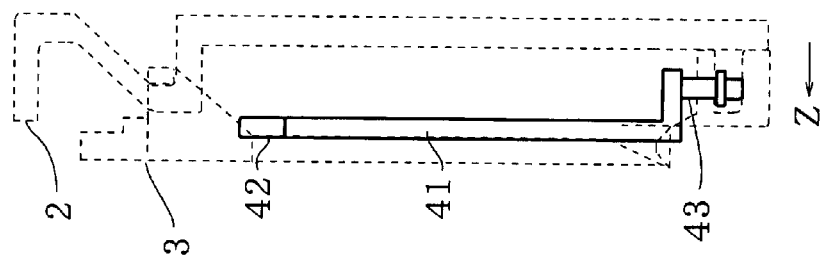
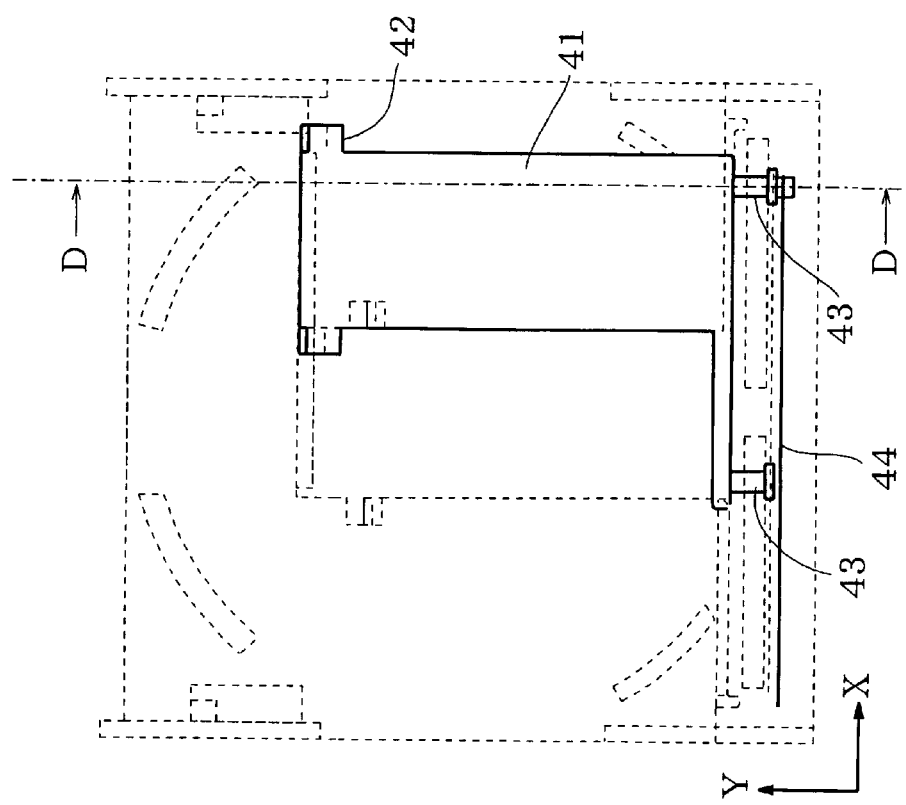

DISC CARTRIDGE HAVING VARIABLE GAP

BACKGROUND OF THE INVENTION

The present invention relates to a disc cartridge, for installing a disc-like information recording medium into an information recording and reproducing device which is used for recording information onto a disc-like information recording medium and for reproducing information from the disc-like information recording medium, and for keeping the disc-like information recording medium that is out of the information recording and reproducing device.

As a typical disc-like information recording medium, a flexible disc is known well, which is widely used as an information memorizing means for a personal computer and a word processor. Generally speaking, a flexible disc is housed in a plastic cartridge having a metal shutter that can slide for exposing a part of the flexible disc. When the cartridge including the flexible disc is installed into the information recording and reproducing device, this shutter is moved to slide by a shutter opening and closing mechanism disposed in the device.

In recent years, an optical disc and a magneto-optical disc are developed, which has extremely large memory capacity compared with the flexible disc. The optical disc and the magneto-optical disc are also housed in a plastic cartridge in the same manner as the flexible disc, for protecting recorded information, i.e., for preventing the information recording surface of the disc from being scratched or having adhesion of fingerprints.

The thickness of the optical disc or the magneto-optical disc is larger than the flexible disc. In addition, the optical disc or the magneto-optical disc rotates at a very high speed in the cartridge when recording or reproducing information. Furthermore, distortion of the disc surface and an eccentricity of the disc should be considered. For such reasons, sufficient clearance between the disc and the inner surface of the cartridge must be secured. Therefore, the cartridge including the optical disc or the magneto-optical disc is wide and thick compared with the disc itself.

In addition, the cartridge of the optical disc or the magneto-optical disc has a shutter in the same manner as that of the flexible disc. This shutter can be moved to slide on the cartridge so that the information recording and reproducing surface of the disc is exposed. This shutter is different from that of the flexible disc cartridge in that the sliding movement of the shutter is restricted by a lock mechanism provided to the cartridge. Thus, undesired exposure of the information recording and reproducing surface of the disc due to the sliding of the shutter is prevented when the disc cartridge is out of the information recording and reproducing device.

However, this lock mechanism of the cartridge needs tiny components for downsizing and thinning of the cartridge. Therefore, manufacturing of the cartridge requires a skill. In addition, a special mechanism for releasing the lock state of the lock mechanism is required to the information recording and reproducing device in which the cartridge is installed. Thus, cost increase cannot be avoided.

SUMMARY OF THE INVENTION

An object of the present invention is to solve the problems mentioned above. A disc cartridge in accordance with the present invention is small and thin when it is out of the information recording and reproducing device, while a sufficient clearance between the disc and the inner surface of the cartridge is secured when it is installed in the information recording and reproducing device.

A disc cartridge in accordance with the present invention includes an upper lid and a lower lid for receiving a disc-like information recording medium therebetween, and variable means for making a gap between the upper lid and the lower lid variable.

Preferably, the variable means includes a cam portion provided to either one of the upper lid and the lower lid, and an engaging portion provided to the other, moving along the cam portion.

More preferably, the variable means further includes a hinge portion provided to either one of the upper lid and the lower lid.

It is also preferable that the upper lid and the lower lid be detachably connected to each other via the cam portion and the engaging portion.

Preferably, the disc cartridge in accordance with the present invention further includes at least a pair of guide means contacting the outer rim of the disc-like information recording medium held at the center portion in the disc cartridge. One of the guide means is provided to the upper lid, and the other is provided to the lower lid.

Still preferably, the disc cartridge in accordance with the present invention further includes a shutter sliding with respect to the upper and lower lids. The upper and lower lids have a first position where the gap therebetween is small, and a second position where the gap therebetween is large. The sliding movement of the shutter is restricted by the upper lid when the upper and lower lids are in the first position, and is performed when the upper and lower lids are in the second position.

It is also preferable that the shutter be moved away from the surface of the disc-like information recording medium housed in the disc cartridge along with the relative movement of the upper lid with respect to the lower lid.

In an embodiment, the variable means increases a clearance between the surface of the disc-like information recording medium and the inner surface of at least one of the upper and lower lids when the disc cartridge is inserted in an information recording and reproducing device.

In another embodiment, the variable means increases a clearance between the outer rim of the disc-like information recording medium and the inner wall of the disc cartridge contacting therewith when the disc cartridge is inserted in an information recording and reproducing device.

The disc cartridge according to the present invention is preferably used for an optical disc or a magneto-optical disc as the disc-like information recording medium.

These and other objects and advantages of the present invention will become clear from the description with reference to the accompanying drawings.

BRIEF DESCRIPTION OF THE DRAWINGS

FIG. 2a is a top view of a lower lid of the disc cartridge in accordance with the embodiment of the present invention.

FIG. 2b is a cross section along A—A line in FIG. 2a.

FIG. 3a is a top view of an upper lid of the disc cartridge in accordance with the embodiment of the present invention.

FIG. 3b is a cross section along B—B line in FIG. 3b.

FIG. 4a is a top view of a shutter and periphery thereof when the disc cartridge is out of the information recording and reproducing device.

FIG. 4b is a cross section along C—C line in FIG. 4a.

FIG. 4c is a top view of a shutter and periphery thereof when the disc cartridge is in the information recording and reproducing device.

FIG. 4d is a cross section along D—D line in FIG. 4c.

DETAILED DESCRIPTION OF THE PREFERRED EMBODIMENTS

The present invention will be described in detail hereinafter with reference to embodiments and the accompanying drawings.

Figure 1:
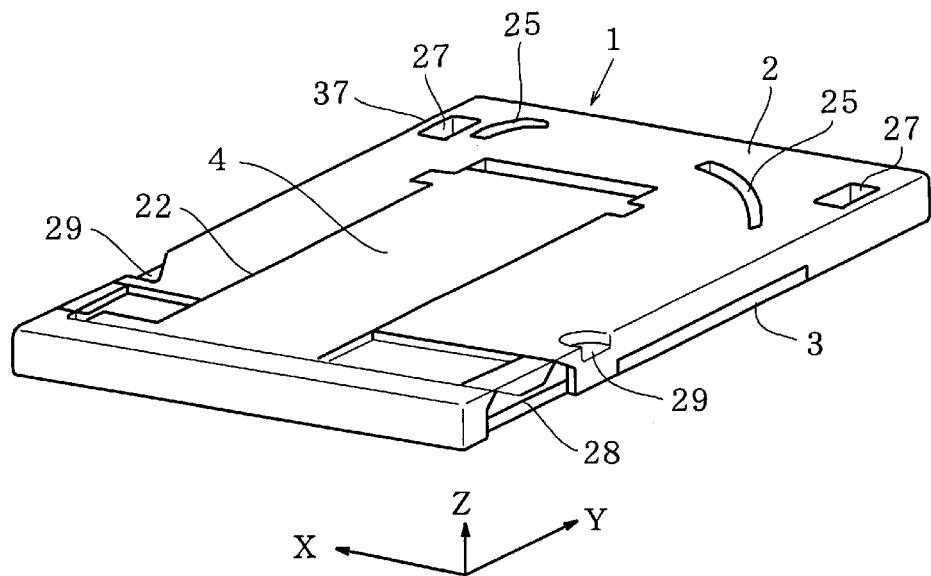
FIG. 1a is a perspective view of a disc cartridge in accordance with an embodiment of the present invention, in which the disc cartridge is out of an information recording and reproducing device.
FIG. 1b is a perspective view of the disc cartridge, in which the disc cartridge is in the information recording and reproducing device.
Figure 1:
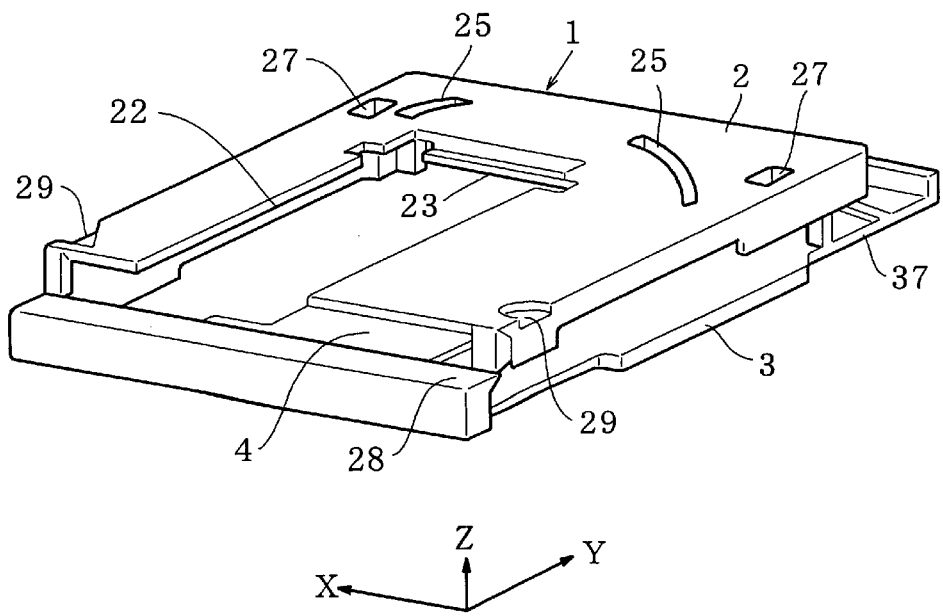

Referring to FIG. 1a, a reference numeral 1 denotes a disc cartridge of the embodiment in a first state where the disc cartridge 1 is out of an information recording and reproducing device, while FIG. 1b shows a second state where the disc cartridge 1 is in the information recording and reproducing device. As shown in FIG. 1b, an upper lid 2 is relatively moved from a lower lid 3 in parallel regarding to principal surfaces of the lids, so that a gap between the upper and lower lids is increased.

FIGS. 2a and 2b show the upper lid 2 of the disc cartridge 1 in a top view and in a cross section. In the same way, FIGS. 3a and 3b show the lower lid 3 of the disc cartridge 1. FIGS. 4a to 4d show a shutter 4 and its periphery of the disc cartridge 1 in top views and in cross sections.

As shown in FIG. 1a, the disc cartridge 1 includes the upper lid 2, the lower lid 3 and the shutter 4. A disc-like information recording medium (hereinafter, referred to a disc) is received in the disc cartridge 1. As shown in FIGS. 1a and 1b, the thickness of the disc cartridge 1 (the thickness in the Z-axis direction) is smaller in the state where it is out of an information recording and reproducing device (not shown) than in the state where it is in the information recording and reproducing device. The gap between the principal surfaces of the upper lid 2 and the lower lid 3 is also smaller in the state where the disc cartridge is out of the information recording and reproducing device.

The shutter 4 is received in a receiving portion 22 provided to the upper lid 2 and is positioned in the substantially same surface (XY surface) as the upper surface of the upper lid 2 when the disc cartridge 1 is out of the information recording and reproducing device as shown in FIG. 1a. By this configuration, the sliding movement of the shutter 4 in X-axis direction is restricted by the upper lid 2. On the other hand, when the disc cartridge 1 is in the information recording and reproducing device as shown in FIG. 1b, the upper lid 2 is moved relatively from the lower lid in the direction that the thickness of the disc cartridge 1 increases (in the Z-axis direction), to the position where the principal surfaces of the upper and lower lids are parallel to each other. On this occasion, the gap between the principal surfaces of the upper lid 2 and the lower lid 3 is increased. Thus, the shutter 4 separates from the receiving portion 22 of the upper lid 2, and can slide as getting under the lower surface of the upper lid 2.

In this way, the unlocked shutter 4 is moved to slide in the disc cartridge 1 by an opening and closing mechanism disposed in the information recording and reproducing device (not shown), so as to reach the position shown in FIG. 1b. Thus, the information recording surface and the center hole of the disc housed in the disc cartridge 1 are exposed via the receiving portion 22. Then, a disc cramping means (not shown) including a cramp and a turn table, provided in the information recording and reproducing device, approaches to the disc through the receiving portion 22, so as to engage the disc center hole for holding the disc rotatively. Then a pickup for reading or recording information irradiates a light beam to the information reading and recording surface of the disc via the receiving portion 22.

FIG. 2a and 2b show the lower lid 3 in detail. FIG. 2a is a plan view, while FIG. 2b is a cross section along A—A line of FIG. 2a.

A main body portion 31 of the lower lid 3 is a substantially flat plate. At substantially center portion of the main body 31, a disc supporting portion 32 is disposed, which has a disc carrying surface 321 and a slanting portion 322. The slanting portion 322 extends from the disc carrying surface 321 to the main body portion 31, and slants toward the main body portion 31 away from the disc surface carried by the disc carrying surface 321. The center portion of the disc supporting portion 32 has a through hole 33. A turn table of the cramp means, for example, which is disposed in the information recording and reproducing device can enter the disc cartridge 1 via the through hole 33, so as to engage the center hole of the disc.

In FIG. 2a, contour of a disc D housed in the disc cartridge 1 is shown in the chain line. Two disc guides 34 having arc shape are attached to the main body portion 31 of the lower lid 3 at a position corresponding to the outer rim of the disc. These two disc guides 34 cooperate with disc guides 24 attached to the upper lid 2 so as to prevent the disc housed in the disc cartridge 1 from moving in the radial direction.

The disc guides 34 fit in guide holes 25 provided to the upper lid 2 when the disc cartridge 1 is out of the information recording and reproducing device, i.e., when the thickness of the disc cartridge 1 is small and the gap between the principal surfaces of the upper lid 2 and lower lid 3 is also small. In addition, the mail body portion 31 of the lower lid 3 has guide holes 35 in which the disc guides 24 of the upper lid 2 can fit.

Furthermore, the main body portion 31 of the lower lid 3 has a pair of slide guides 36 along which pins 43 of the shutter 4 can slide. The slide guides 36 cooperate with slide guides 26 of the upper lid 2 so as to form cam slots 5 along which the pins 43 of the shutter 4 can slide. Detail structure thereof will be explained below.

The main body portion 31 has a boss 38 close to the slide guide 36. An end of a spring 44 is connected to the boss 38 and the other end thereof is connected to the shutter 4.

The main body portion 31 has a pair of cam portions 37 at both sides. Each of the cam portions 37 includes a slanting portion 371 sliding in contact with an engaging portion 27 of the upper lid 2, and a retaining portion 372 that restricts the movement of the engaging portion 27.

FIGS. 3*a* and 3*b* show detail configuration of the upper lid 2. FIG. 3*a* is a top view and FIG. 3*b* is a cross section along B—B line in FIG. 3*a*.

A main body portion 21 of the upper lid 2 is substantially a flat plate, which has a receiving portion 22 disposed at substantially middle portion. The receiving portion 22 extends to the rear (in the Y-axis direction as shown in FIG. 1*a*). The receiving portion 22 receives the shutter 4 and restricts movement of the shutter 4 when the disc cartridge 1 is out of the information recording and reproducing device, i.e., when the thickness of the disc cartridge 1 is small. The width of the receiving portion 22 (in the X-axis direction as shown in FIG. 1*a*) is substantially the same as that of the shutter 4. Thus, the shutter 4 is prevented from moving when the shutter 4 is fitted in the receiving portion 22.

The main body portion 21 of the upper lid 2 has a pair of cut portions 221 and a pair of protruding portions 222 disposed at substantially middle portion and in the receiving portion 22. Furthermore, a shutter guide 23 is formed as extending in the sliding direction of the shutter 4. These configurations will be explained below in detail. In addition, a guide opening 223 is formed at the opposite side of the cut portions 221 and the protruding portions 222 in the receiving portion 22. The guide opening 223 extends in the sliding direction of the shutter 4 so that the shutter slides along the guide hole 223.

The main body portion 21 of the upper lid 2 has two arc-shaped disc guides 24 disposed at the position corresponding to the outer rim of the disc. These disc guides 24 cooperate with the above-mentioned disc guides 34 of the lower lid 3 to restrict the radial movement of the disc housed in the disc cartridge 1.

When the disc cartridge 1 is out of the information recording and reproducing device, i.e., when the thickness of the disc cartridge 1 is small, the disc guides 24 fit in the guide holes 35 of the lower lid 3. In addition, as explained before, the main body portion 21 of the upper lid 2 has the guide holes 25 in which the disc guides 34 of the lower lid 2 fit, in the same manner as the lower lid 2.

In addition, the main body portion 21 of the upper lid 2 has a pair of slide guides 26 along which pins 43 of the shutter 4 can slide. These slide guides 26 cooperate with the above-mentioned slide guides 36 of the lower lid 3 to form the cam slots 5 along which the pins 43 of the shutter 4 can slide. Detail explanation will be added below.

The main body portion 21 has a pair of engaging portions 27. This engaging portion 27 includes a lower contact portion 271 contacting the lower slanting surface of the slanting portion 371 in the cam portion 37 provided to the lower lid 3, and an upper contact portion 272 contacting the upper slanting surface of the slanting portion 371. In other words, The lower contact portion 271 and the upper contact portion 272 are positioned so that the slanting portion 371 of the lower lid 3 is disposed between the lower contact portion 271 and the upper contact portion 272. Thus, the lower contact portion 271 and the upper contact portion 272 can slide on respective surfaces of the slanting portion 371. The lower contact portion 271 fits in a retaining portion 372 of the cam portion 37 at the end of the movement to finish the entire movement of the engaging portion 27.

The engaging portion 27 has an engaging hole 273. When the disc cartridge 1 is out of the information recording and reproducing device, i.e., when the thickness of the disc cartridge 1 is small, the end of the cam portion 37 of the lower lid 3 can fit in the engaging hole 273.

The main body portion 21 has a pair of hinge portions 28 at both sides which are opposing side of the engaging portions 27. The hinge portion includes a first hinge 281, a second hinge 282, and middle portion 283 disposed between the hinges 281 and 282. While the above-mentioned upper contact portion 271 and the lower contact portion 272 move on the slanting surface of the slanting portion 371, the first and second hinges 281 and 282 are getting bent. Thus, the upper lid 2 can move relatively to the lower lid 3 (in the Y-axis and Z-axis directions shown in FIG. 1*a*).

As shown in FIGS. 1*a* and 1*b*, the main body portion 21 has a pair of engaging grooves 29 at both sides between the engaging portion 27 and the hinge portion 28. When the disc cartridge 1 is inserted in the information recording and reproducing device from the front end portion having the engaging portion 27 and the hinge portion 28, a pin disposed in the information recording and reproducing device engages the engaging grooves 29. While further inserting the disc cartridge 1, a force driving the upper lid 2 to move relatively from the lower lid 3 is generated. The engaging groove 29 may also work for retaining the disc cartridge 1 when the disc cartridge 1 is loaded in the information recording and reproducing device.

Figure 4:
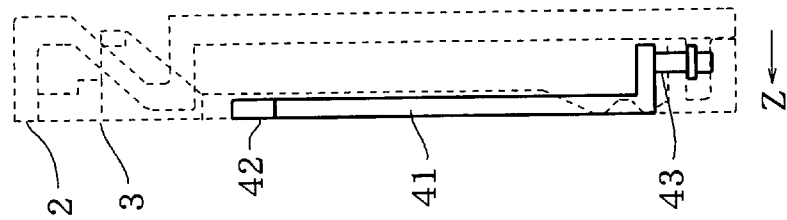
Figure 4:
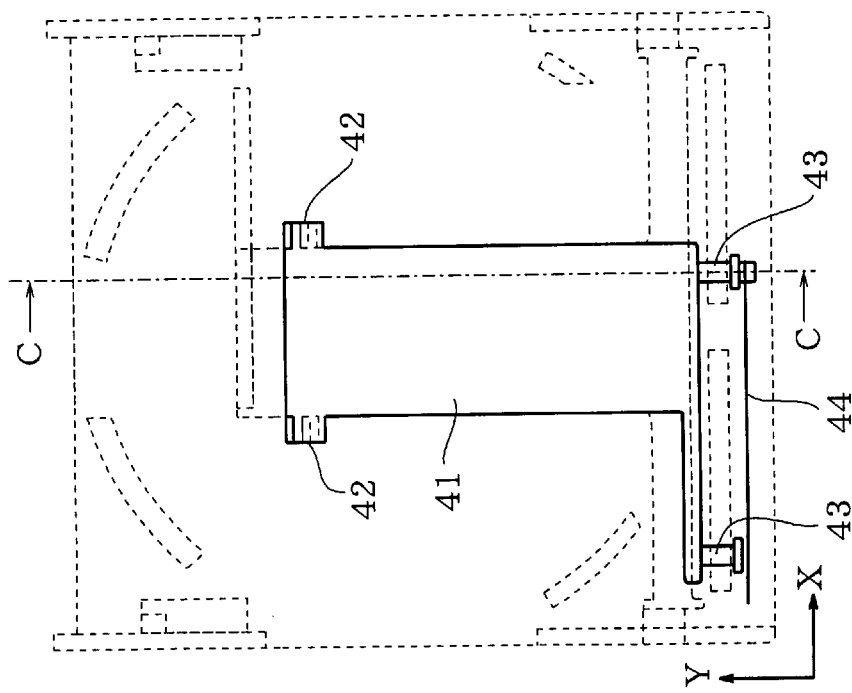

Next, configuration of the shutter 4 will be explained in detail with reference to FIGS. 4*a*–4*b*. FIGS. 4*a* and 4*c* are top views. FIG. 4*a* shows the shutter 4 received in the receiving portion 22 of the upper lid 2 when the disc cartridge 1 is out of the information recording and reproducing device, i.e., when the thickness of the disc cartridge 1 is small. FIG. 4*b* is a cross section along C—C line in FIG. 4*a*. In contrast, FIG. 4*c* shows the shutter 4 sliding to get under the lower surface of the upper lid 2 when the disc cartridge 1 is inserted in the information recording and reproducing device, i.e., when the upper lid 2 is moved relatively to the lower lid 3. FIG. 4*d* is a cross section along D—D line in FIG. 4*c*. In each figures, the outlines of the upper lid 2 and the lower lid 3 are shown by overlaying dotted lines.

Figure 7:
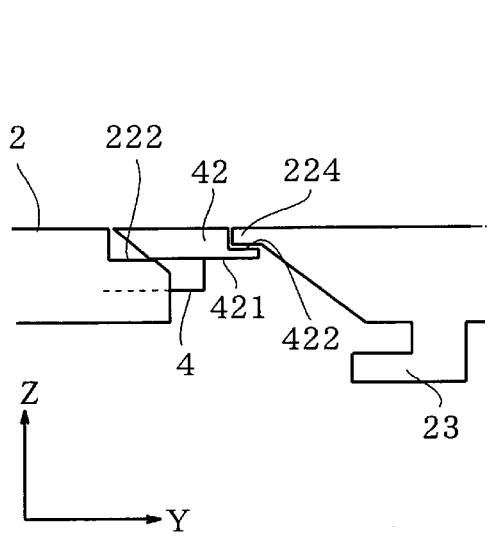
FIGS. 7a and 7b are cross sections showing the end portion of the shutter of the disc cartridge in accordance with the embodiment of the present invention.
Figure 7:
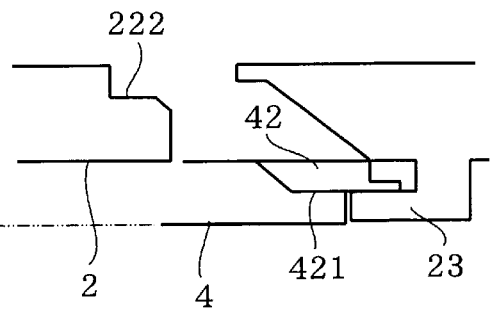

A main body portion 41 of the shutter 4 has substantially rectangular shape, at end of which a collar portion 42 is formed. The collar portion 42 has substantially the same shape as the cut portion 221 of the receiving portion 22 provided to the upper lid 2. Relationship between the collar portion 42 and the cut portion 221 will be explained below in detail with reference to FIGS. 7*a* and 7*b*.

The main body portion 41 has a pair of pins 43 at the wall of the rear end portion thereof. The pins 43 slide along the cam slots 5 formed by the pair of slide guides 26 provided to the main body portion 21 of the upper lid 2 and the pair of slide guides 36 provided to the main body portion 31 of the lower lid 3. One of the pins 43 is connected to an end of the spring 44 that normally forces the shutter in the closing direction (to the left in FIG. 4*a*). The other end of the spring is connected to the boss 38 disposed close to the slide guide 36 at the main body portion 31 of the lower lid 3.

As shown in FIG. 4*b*, when the disc cartridge 1 is out of the information recording and reproducing device, i.e., when the thickness of the disc cartridge 1 is small, the shutter 4 is received in the receiving portion 22 of the upper lid 2. In this state, the upper surface of the shutter 4 and the upper surface of the upper lid 2 are substantially on the same plane (i.e., XY plane). Thus, the upper surface of the disc cartridge 1 is a flush surface without steps, so that a disc cartridge 1 has a good appearance and, plural disc cartridges can be stacked without looseness for storage.

When the disc cartridge is inserted in the information recording and reproducing device, i.e., when the upper lid 2 is moved relatively away from the lower lid 3 as shown in FIG. 4d, the front end portion of the shutter 4 is lifted upward (in the Z-axis direction) by the shutter guide 23 of the upper lid 2 via the pin 43. When the shutter 4 is moved to slide in the opening direction (in the X direction) by the shutter opening and closing mechanism disposed in the information recording and reproducing device, the front end portion of the shutter 4 slides on the shutter guide 23. In addition, since the pins 43 provided to the wall of the rear end portion of the shutter 4 slide in the cam slots 5 formed by the slide guides 26 and 36, the rear end portion of the shutter 4 is also lifted upward (in the Z direction) in the same way as the front end portion thereof. Thus, the principal surface of the main body portion 41 of the shutter 4 can slide while maintaining the substantially parallel position to the principal surfaces of the upper lid 2 and the lower lid 3. In addition, a clearance between the shutter 4 and the disc housed in the disc cartridge 1 is secured so as to prevent abutting of the rotating disc to the main body portion 41. The movement of the front end portion and the pin 43 of the shutter 4 will be explained below in detail.

Next, detail configuration of each portion will be explained with reference to FIGS. 5 to 7b.

Figure 5:
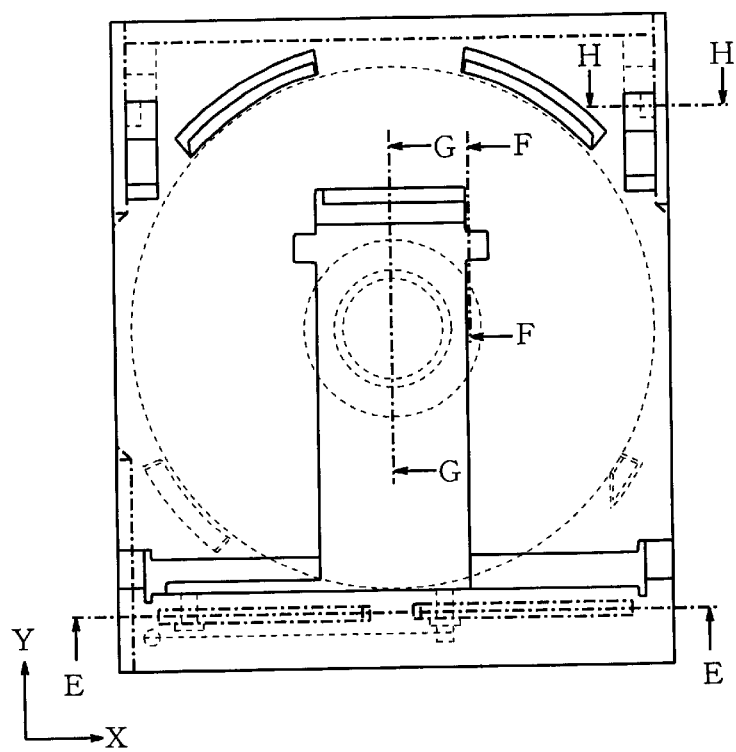
FIG. 5 is a top view of the disc cartridge in accordance with the embodiment of the present invention.
Figure 6:
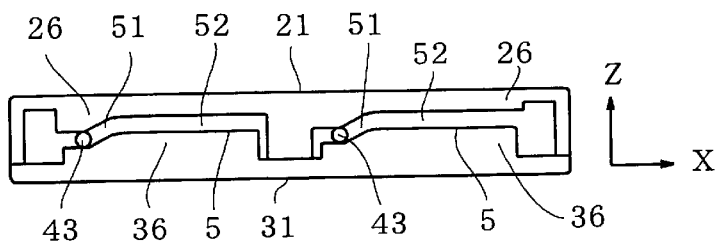
FIGS. 6a and 6b are cross sections of the disc cartridge including a slide guide in accordance with the embodiment of the present invention.
Figure 6:
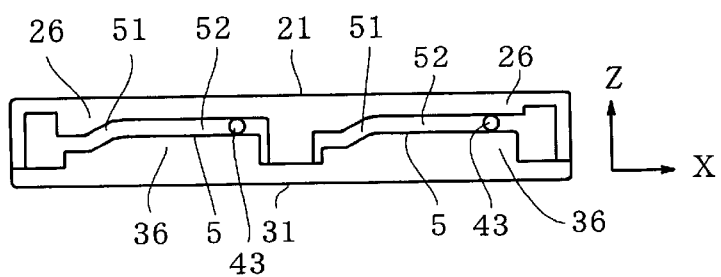

FIG. 5 is a top view showing entire disc cartridge 1 (shown in FIG. 1a). The broken line or the dotted line shows hidden parts for easy understanding.

FIGS. 6a and 6b are cross sections along E—E line in FIG. 5, showing the detailed configuration of the cam slots 5 formed by the pair of slide guides 26 provided to the main body portion 21 of the upper lid 2, the pair of slide guides 36 provided to the main body portion 31 of the lower lid 3, and the pair of pins 43 provided to the main body portion 41 of the shutter 4.

FIG. 6a shows the state where the shutter 4 is received in the receiving portion 22 formed in the upper lid 2 when the disc cartridge 1 is out of the information recording and reproducing device, i.e., when the thickness of the disc cartridge 1 is small. In this state, the pair of pins 43 provided to the shutter 4 is positioned at the bottom portion of the cam slot 5 that is front side of a slanting portion 51.

FIG. 6b shows the state where the shutter 4 is moved to slide in the X direction when the disc cartridge 1 is inserted in the information recording and reproducing device. As understood by this figure, in the process of sliding of the shutter 4, the pair of pins 43 are lifted in the Z direction by the slanting portion 51 of the cam slot 5. After that, along flat portions 52 of the cam slot 5, the principal surface of the main body portion 41 of the shutter 4 moves while maintaining substantially the parallel position to the principal surfaces of the upper lid 2 and the lower lid 3. Thus, the main body portion 41 of the shutter 4 is lifted as mentioned above, so that a clearance between the shutter 4 and the disc housed in the disc cartridge 1 is secured.

FIGS. 7a and 7b show the relationship between the front end portion of the shutter 4, and the cut portion 221 and the shutter guide 23 both provided to the upper lid 2. FIGS. 7a and 7b are cross sections along F—F line in FIG. 5. The FIG. 7a shows the state where disc cartridge 1 is out of the information recording and reproducing device, i.e., where the shutter is received in the received portion 22 formed in the upper lid 2. As shown in FIG. 7a, a part of the lower surface 421 of the collar portion 42 provided to the front end portion of the shutter 4 contacts the upper surface of the protruding portion 222 in the cutportion 221 of the upper lid 2. A recess 422 is formed at the tip of the collar portion 42 of the shutter 4. The upper surface of the recess 422 and the lower surface of the extending portion 224 of the upper lid 2 are contacted with each other. Thus, the vertical movement (in the X direction) of the front end portion of the shutter 4 with respect to the upper lid 2 is restricted.

When the disc cartridge 1 is inserted in the information recording and reproducing device, the upper lid 2 moves relatively to the lower lid 3. In this relative movement, the upper lid 2 moves upward and slantwise with respect to the principal surface of the shutter 4 (upward and leftward in the FIGS. 7a and 7b). As shown in FIG. 7b, before finishing of the movement, a part of the lower surface of the front end portion of the shutter 4 contacts the upper surface of the shutter guide 23 provided to the upper lid 2. Then, the shutter 4 is lifted upward (in the Z direction) by further relative movement of the upper lid 2 from the lower lid 3. This upward movement of the shutter 4 (in the Z direction) is substantially the same distance as the upward movement by the slanting portion 51 of the cam slot 5 formed by the pair of slide guides 26 provided to the main body portion 21 of the upper lid 2 and the pair of slide guides 36 provided to the main body portion 31 of the lower lid 3. Thus, the parallel position relationship among the shutter 4, the upper lid 2 and the lower lid 3 is secured when the shutter 4 is moved in the opening direction until the above-mentioned pin 43 reaches the upper end of the slanting portion 51. This further movement of the shutter 4 in the opening direction is performed by the movement of the pin 43 in the flat portion 52 while maintaining the parallel position relationship with the upper lid 2 and the lower lid 3.

In FIGS. 7a and 7b, the reference line drawn in the chain line shows height of the upper surface of the upper lid 2 when the disc cartridge 1 is out of the information recording and reproducing device. As understood from FIGS. 7a and 7b, the height of the lower surface of the shutter 4 after the relative movement of the upper lid 2 and the lower lid 3 is substantially the same as the height of the upper surface of the upper lid 2 when the disc cartridge 1 is out of the information recording and reproducing device. However, the position of the shutter 4 after the movement is within the thickness of the upper lid 2 since the upper lid 2 is moved along with the shutter 4.

Figure 8:
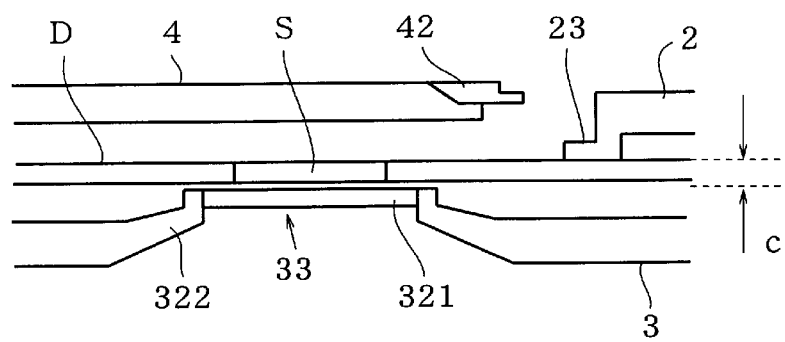
FIGS. 8a and 8b are cross sections showing the center portion of the disc cartridge in accordance with the embodiment of the present invention.
Figure 8:
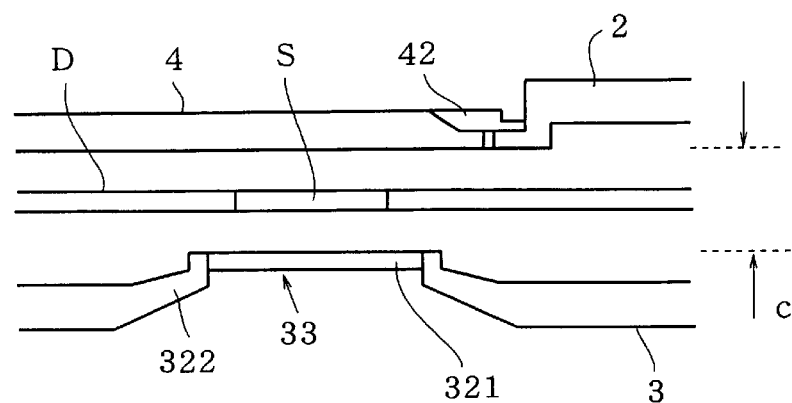

FIGS. 8a and 8b are schematic cross sections of the center portion of the disc cartridge 1, which are along G—G line in FIG. 5. FIG. 8a shows the state where the disc cartridge 1 is out of the information recording and reproducing device, while FIG. 8b shows the state where the disc cartridge 1 is inserted in the information recording and reproducing device, and the upper lid 2 and the lower lid 3 are moved relatively to each other.

In FIG. 8a, the disc D is placed on the circular disc carrying surface 321 of the disc supporting portion 32 provided to the lower lid 3. The center portion of the disc supporting portion 32 is provided with the circular through hole 33 having a diameter larger than the center hole S of the disc D, and smaller than the information recording surface area of the disc D, so that the information recording portion cannot be damaged and the disc D can be kept in parallel to the principal surface of the lower lid 3. In addition, when the disc cartridge 1 is out of the information recording and reproducing device, the gap between the surface of the disc D and the disc carrying surface 321 is very small, so that invasion of dust into the disc cartridge can be prevented without a shutter for closing the through hole 33.

On the upper surface of the disc D the lower surface of the shutter guide 23 of the upper lid 2 is positioned. The vertical movement of the disc D is restricted by the lower surface of the shutter guide 23 and the disc carrying surface 321 of the disc supporting portion 32. A non woven fabric or a rubber can be applied to the lower surface of the shutter guide 23 and the disc carrying surface 321 so that the information recording surface of the disc D is protected from scratches.

FIG. 8*b* shows the state where the disc cartridge 1 is inserted in the information recording and reproducing device and the upper lid 2 is moved relatively to the lower lid 3. In this state, the clearance C between the lower surface of the shutter guide 23 and the disc carrying surface 321 is increased compared with that shown in FIG. 8*a*. By forming the clearance C, the disc D can rotate in the disc cartridge 1 without abutting members of the disc cartridge 1.

Figure 9:
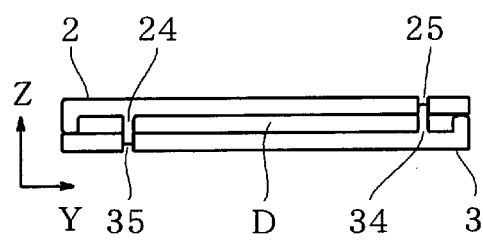
FIGS. 9a and 9b are schematic views showing relative movement of the upper and lower lids of the disc cartridge in accordance with the embodiment of the present invention.
Figure 9:
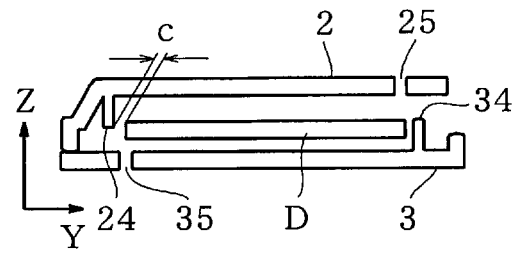

FIGS. 9*a* and 9*b* show clearances between the disc D and the disc cartridge 1 in the radial direction of the disc D. FIG. 9*a* shows the state where the disc cartridge 1 is out of the information recording and reproducing device, i. e., where the thickness of the disc cartridge 1 is small. In this state, the movement of disc D in the radial direction is restricted by the disc guide 24 of the upper lid 2 and the disc guide 34 of the lower lid 3.

FIG. 9*b* shows the state where the disc cartridge 1 is inserted in the information recording and reproducing device. In this state, the upper lid 2 and the lower lid 3 are moved relatively to each other in the Z-axis direction and in the Y-axis direction. A predetermined clearance C is generated between the outer rim of the disc D and the disc guide 24, and between the outer rim of the disc D and the disc guide 34. Thus, when the disc D rotates in the disc cartridge 1, abutting of the outer rim of the disc D to the disc guide 24 or 34 is prevented even if there is a small eccentricity of the rotation of the disc.

Figure 10:
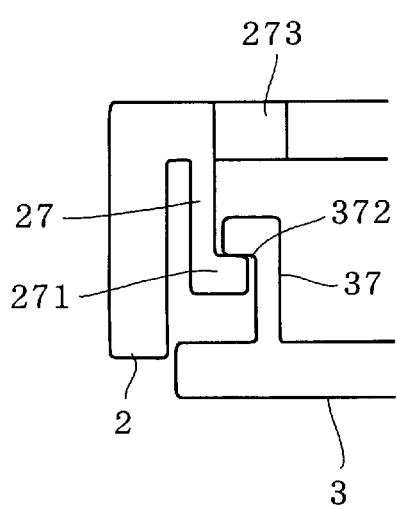
FIGS. 10a and 10b are cross sections showing departure of the upper lid from the lower lid of the disc cartridge in accordance with the embodiment of the present invention.
Figure 10:
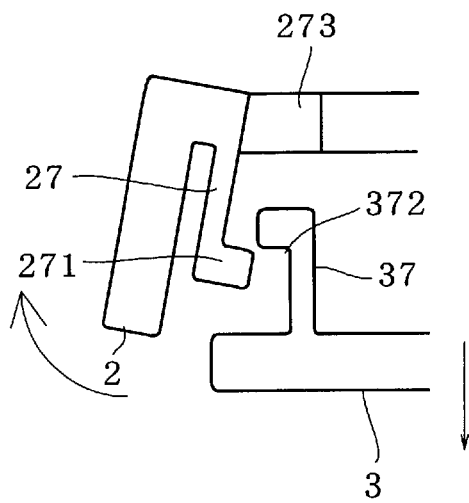

FIGS. 10*a* and 10*b* are cross sections along H—H line in FIG. 5, showing a method for departing the upper lid 2 from the lower lid 3. FIG. 10*a* shows the state where the disc cartridge 1 is out of the information recording and reproducing device, and the upper lid 2 and the lower lid 3 can be moved relatively to each other by a user as shown in FIG. 10*b*. From this state the upper lid 2 is forced upward or the lower lid is forced downward in the direction of the arrow. Then, as shown in FIG. 10*b*, the engaging portion 27 of the upper lid 2 rotates flexibly with respect to the main body portion 21, so that the upper lid 2 separates from the lower lid 3 by the hinge portion 28. On this occasion, the end portion of the upper lid 2 that is opposite to the engaging portion 27 with respect to the hinge portion 28 is fixed to the end portion of the lower lid 3 via an adhesive for example, so that the upper lid 2 and the lower lid 3 is not separated. Thus, the user can exchange the disc D in the disc cartridge 1 easily.

Figure 11A:
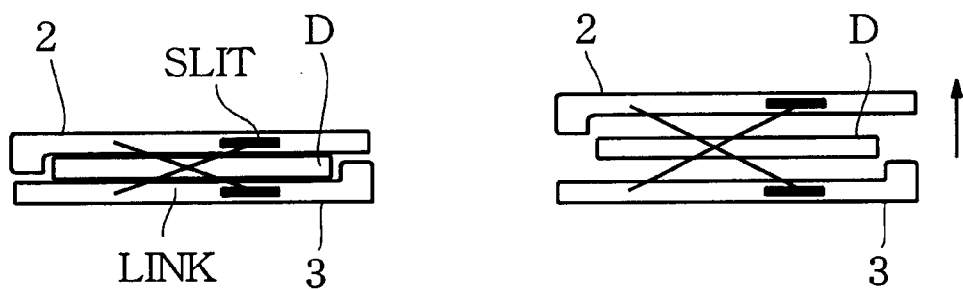
FIGS. 11a and 11b are schematic views showing other embodiments of the disc cartridge in accordance with the present invention.
Figure 11:
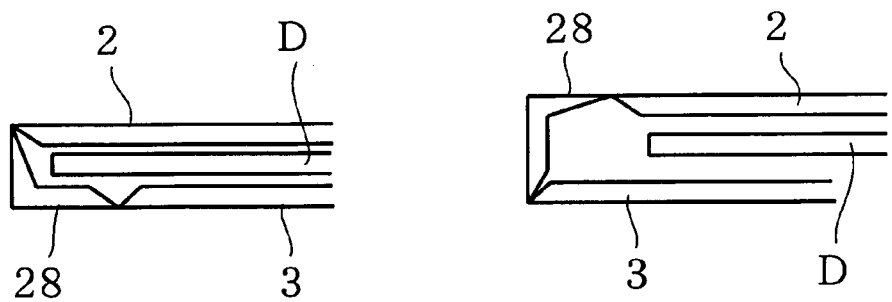

FIGS. 11*a* and 11*b* show other embodiments in schematic drawings.

In the first embodiment mentioned above, the upper lid 2 moves relatively to the lower lid 3 upward and slantwise. However, a configuration such as shown in FIG. 11*a* is also possible, in which the upper lid 2 can move straightly upward to the lower lid 3 through a link mechanism.

It is also possible to replace the hinge portion 28 of the first embodiment with that having a structure as shown in FIG. 11*b*. In this case, the upper lid 2 and the lower lid 3 can be integrally molded by a resin material with the hinge portion.

As mentioned above, in the disc cartridge according to the present invention, a clearance between the disc housed in the disc cartridge and the inner surface of the disc cartridge can be secured so that the disc can rotate smoothly when the disc cartridge is inserted in the information recording and reproducing device.

On the other hand, when the disc cartridge is out of the information recording and reproducing device, the thickness and the width of the disc cartridge decreases to be compact. In this case, the disc housed in the disc cartridge can be stored securely without looseness.

Though the conventional disc cartridge does not permit exchange of the disc housed in it, the disc cartridge of the present invention permits the exchange of the disc by the simple configuration, so that the disc cartridge of the present invention can be used for various applications.

While the presently preferred embodiments of the present invention have been shown and described, it is to be understood that these disclosures are for the purpose of illustration, and that various changes and modifications may be made without departing from the scope of the invention as set forth in the appended claims.

What is claimed is:

1. A disc cartridge comprising:
    an upper lid and a lower lid for receiving a disc-like information recording medium therebetween;
    variable means for making a gap between the upper lid and the lower lid variable; and
    a shutter sliding with respect to the upper and lower lids, wherein the upper and lower lids have a first position where the gap therebetween is small, and a second position where the gap therebetween is large, and further the sliding movement of the shutter is restricted by the upper lid when the upper and lower lids are in the first position, and is performed when the upper and lower lids are in the second position.

2. The disc cartridge according to claim 1, wherein the variable means comprises a cam portion provided to either one of the upper lid and the lower lid, and an engaging portion provided to the other, moving along the cam portion.

3. The disc cartridge according to claim 2, wherein the upper lid and the lower lid are detachably connected to each other via the cam portion and the engaging portion.

4. The disc cartridge according to claim 1 or 2, wherein the variable means comprises a hinge portion provided to either one of the upper lid and the lower lid.

5. The disc cartridge according to claim 1, further comprising at least a pair of guide means contacting an outer rim of the disc-like information recording medium held at the center portion in the disc cartridge, wherein one of the guide means is provided to the upper lid and the other is provided to the lower lid.

6. The disc cartridge according to claim 5, wherein the variable means increases a clearance between the outer rim of the disc-like information recording medium and the guide means of the disc cartridge when the disc cartridge is inserted in an information recording and reproducing device.

7. The disc cartridge according to claim 1, wherein the shutter is moved away from a surface of the disc-like information recording medium housed in the disc cartridge along with the relative movement of the upper lid with respect to the lower lid.

8. The disc cartridge according to claim 1, wherein the variable means increases a clearance between a surface of the disc-like information recording medium and the inner surface of at least one of the upper and lower lids when the disc cartridge is inserted in an information recording and reproducing device.

9. The disc cartridge according to claim 1, wherein the disc-like information recording medium is an optical disc.

10. The disc cartridge according to claim 1, wherein the disc-like information recording medium is a magneto-optical disc.

* * * * *